Figure 2:
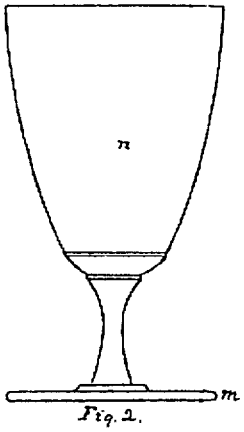
Figure 1:
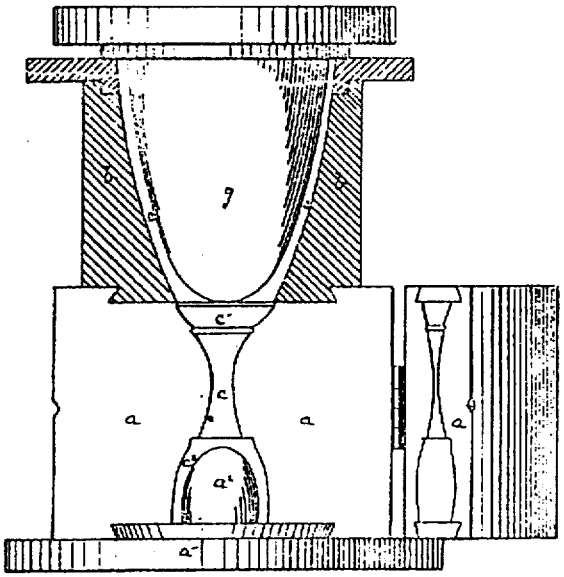

D15-136. OR D6,804 EX

DESIGN.

J. H. HOBBS.

Glass Goblets.

No. 6860 Reissued Jan. 18, 1876.

WITNESSES
R. C. Henderson
James A. Kay

INVENTOR
John H. Hobbs,
by Bakewell, Christy & Kerr,
his Attys.

UNITED STATES PATENT OFFICE.

JOHN H. HOBBS, OF WHEELING, WEST VIRGINIA, ASSIGNOR TO J. H. HOBBS, BROCKUNIER & CO., OF SAME PLACE.

DESIGN FOR GLASS GOBLETS.

6804
Specification forming part of Design No. 6,804, dated August 19, 1873; Reissue No. 6,860, dated January 18, 1876; application filed January 10, 1876.

DIVISION A.

*To all whom it may concern:*

Be it known that I, JOHN H. HOBBS, of Wheeling, in the county of Ohio, State of West Virginia, have invented a new and useful Design for Pressed-Glass Goblet-Bowls; and I do hereby declare the following to be a full, clear, and exact description thereof, reference being had to the accompanying drawing, making part of this specification, which shows in outline elevation a pressed-glass goblet illustrative of my improved design, which consists in the peculiar taper form given to the pressed goblet-bowl, as herein shown and described.

The foot *m* and stem *m'* of the goblet are of any desired form. The bowl *n* is pressed so as to have a taper form through nearly its entire length, substantially as shown, with the up-and down lines of its outersides approaching nearly or quite to straight lines through the greater part of their length, the upper part being curved slightly inward to give a mouth with vertical sides, and the lower ends of said lines being tangential to the curve of the base of the bowl.

I claim herein—

The design for pressed goblet-bowls of a taper form through nearly the entire length of the bowl, substantially as described and shown.

In testimony I, the said JOHN H. HOBBS, have hereunto set my hand.

JOHN H. HOBBS.

Witnesses:

JAS. CUMMINS,
B. M. HILDRETH.